United States Patent [19]

Penick

[11] Patent Number: 4,523,987
[45] Date of Patent: Jun. 18, 1985

[54] FEED MIXING TECHIQUE FOR FLUIDIZED CATALYTIC CRACKING OF HYDROCARBON OIL

[75] Inventor: Joe E. Penick, Princeton, N.J.

[73] Assignee: Mobil Oil Corporation, New York, N.Y.

[21] Appl. No.: 665,333

[22] Filed: Oct. 26, 1984

[51] Int. Cl.³ ............................................. C10G 11/18
[52] U.S. Cl. ................................... 208/157; 208/113; 208/153; 208/164
[58] Field of Search ................ 208/157, 164, 113, 153

[56] References Cited

U.S. PATENT DOCUMENTS

| | | | |
|---|---|---|---|
| 2,695,265 | 11/1954 | Degnen | 208/164 |
| 2,899,374 | 8/1959 | Gomory | 208/164 |
| 3,123,547 | 3/1964 | Palmer et al. | 208/164 |
| 3,152,065 | 10/1964 | Sharp et al. | 208/157 |
| 3,261,776 | 7/1966 | Baumann et al. | 208/113 |
| 3,353,925 | 11/1967 | Baumann et al. | 208/153 |
| 3,654,140 | 4/1972 | Griffel et al. | 208/113 |
| 3,799,868 | 3/1974 | Gantt | 208/153 |
| 3,812,029 | 5/1974 | Snyder, Jr. | 208/113 |
| 3,997,428 | 12/1976 | McKenna | 208/78 |
| 4,149,964 | 4/1979 | Bartholic | 208/157 |

*Primary Examiner*—D. E. Gantz
*Assistant Examiner*—Anthony McFarlane
*Attorney, Agent, or Firm*—A. J. McKillop; M. G. Gilman; L. G. Wise

[57] ABSTRACT

In a fluid catalytic cracking process comprising admixing a hydrocarbon oil feed with hot regenerated catalyst in the bottom section of a reactor riser, passing the mixture of the hydrocarbon oil feed and the catalyst through the riser, thereby at least partially volatilizing the oil feed and effecting cracking thereof at the process temperature under endothermic process conditions and deactivating the catalyst by deposition of carbonaceous deposits thereon, separating the deactivated catalyst from the cracked hydrocarbonaceous feed, passing the deactivated catalyst to a regenerator vessel wherein the carbonaceous deposits are removed from the deactivated catalyst under exothermic process conditions by means of a regenerating medium introduced into the regenerator vessel, and passing the regenerated hot catalyst substantially above process cracking temperature to the bottom section of the reactor riser; the improvement comprising continuously injecting liquid oil feed into a primary mixing zone in a venturi tube mixer spaced inwardly from the reactor riser wall at the bottom portion therein adjacent a regenerated catalyst return conduit;

continuously passing a first portion of the hot regenerated catalyst into the venturi tube mixer sufficient to vaporize a major amount of oil feed without substantial cracking thereof; and passing a remaining second hot regenerated catalyst portion into the reactor riser through a passage between the venturi tube mixer and reactor riser wall, thereby mixing additional hot catalyst with vaporized oil feed to crack the oil feed in the reactor riser above the venturi tube mixer.

4 Claims, 3 Drawing Figures

FEED MIXING TECHIQUE FOR FLUIDIZED CATALYTIC CRACKING OF HYDROCARBON OIL

BACKGROUND OF THE INVENTION

This invention relates to fluidized catalytic cracking (FCC) units for converting heavy petroleum fractions to produce lighter fuel products. In particular it relates to a mixing device for combining a continuous liquid feed stream with hot fluidizable solid catalyst particles in a fast riser type FCC vessel.

Conversion of various petroleum fractions to more valuable products in catalytic reactors is well known in the refining industry where the use of FCC reactors is particularly advantageous for that purpose. The FCC reactor typically comprises a thermally balanced assembly of apparatus comprising the reactor vessel containing a mixture of regenerated catalyst and the feed and regenerator vessel wherein spent catalyst is regenerated. The feed is converted in the reactor vessel over the catalyst, and carbonaceous deposits simultaneously form on the catalyst, thereby deactivating it. The deactivated (spent) catalyst is removed from the reactor vessel and conducted to the regenerator vessel, wherein coke is burned off the catalyst with air, thereby regenerating the catalyst. The regenerated catalyst is then recycled to the reactor vessel. The reactor-regenerator assembly must be maintained in steady state heat balance, so that the heat generated by burning the coke provides sufficient thermal energy for catalytic cracking in the reactor vessel. The steady state heat balance is usually achieved and maintained in FCC reactors by controlling the rate of flow of the regenerated catalyst from the regenerator to the reactor by means of an adjustable slide valve in the regenerator-to-reactor conduit.

Typically, the product stream of the catalytic cracker is fractionated into a series of products, including gas, gasoline, light gas oil, and heavy cycle gas oil. A portion of the heavy cycle gas oil is usually recycled into the reactor vessel and mixed with fresh feed. The bottom effluent of the fractionator is conventionally subjected to settling and the solid-rich portion of the settled product may be recycled to the reactor vessel in admixture with the heavy cycle gas oil and feed.

In a modern FCC reactor, the regenerated catalyst is introduced into the base of a riser reactor column in the reactor vessel. A primary purpose of the riser reactor is to crack the petroleum feed. The regenerated hot catalyst is admixed in the bottom of the riser reactor with a stream of fresh feed and recycled petroleum fractions, and the mixture is forced upwardly through the riser reactor. During the upward passage of the catalyst and of the petroleum fractions, the petroleum is cracked, and coke is simultaneously deposited on the catalyst. The coked catalyst and the cracked petroleum components are passed upwardly out of the riser and through a solid-gas separation system, e.g., a series of cyclones, at the top of the reactor vessel. The cracked petroleum fraction is conducted to product separation, while the coked catalyst, after steam stripping, passes into the regenerator vessel and is regenerated therein, as discussed above. Most of the cracking reactions in such modern FCC units take place in the riser reactor. Accordingly, the remainder of the reactor vessel is used primarily to separate entrained catalyst particles from the petroleum fractions.

Further details of FCC processes can be found in: U.S. Pat. Nos. 3,152,065 (Sharp et al); 3,261,776 (Banman et al); 3,654,140 (Griffel et al); 3,812,029 (Snyder); 4,093,537 (Gross et al); 4,118,337 (Gross et al); 4,118,338 (Gross et al); 4,218,306 (Gross et al); 4,444,722 (Owen); 4,459,203 (Breech et al); as well as in Venuto et al, Fluid Catalytic Cracking With Zeolite Catalysts, Marcel Dekker, Inc. (1979). The entire contents of all of the above patents and publications are incorporated herein by reference.

Performance characteristics of FCC reactors can be measured by a number of factors, e.g., conversion of feed to all of the products of the FCC reactor, such as gasoline, coke and gas; selectivity of the conversion of feed to gasoline grade products; and octane number of product gasoline.

Conventional FCC catalyst may be used in the reactor utilizing the process. Suitable catalysts are, for example, those containing silica and silica alumina or mixtures thereof. Particularly useful are acidic zeolites, preferably low coke-producing crystalline zeolite cracking catalysts comprising faujasite, crystalline zeolites and other zeolites known in the art. Typically, the catalyst is a fine particle having an average size of about 20 to 100 microns.

In FCC cracking hot catalyst (650° C.±) is mixed with relatively cold (150°–375° C.) charge stock. The catalyst is the heat transfer medium for vaporizing and superheating the oil vapor to a temperature suitable for the desired cracking reaction (480°–545° C.). In the initial stage of mixing oil and catalyst, some oil is inevitably heated to a temperature approaching that of the hot catalyst with consequent overcracking, creating a large increase in gas make. Coking of the catalyst is particularly heavy when the hot catalyst contacts oil in the liquid phase above cracking temperature.

It is an object of the present invention to control the initial mixing so as to minimize localized overheating and decrease coking.

SUMMARY OF THE INVENTION

The improvement herein comprises a novel technique for continuously injecting liquid oil feed into a primary mixing zone in a venturi tube mixer spaced inwardly from the reactor riser wall at the bottom portion therein adjacent a regenerated catalyst return conduit.

In a preferred embodiment an improved reactor is provided for fluidized bed catalytic cracking comprising a vertical riser operatively connected to receive hot regenerated catalyst from a regeneration loop; means for feeding liquid oil under pressure to at least one bottom inlet nozzle; mixing means for combining a first catalyst increment from the regeneration loop with liquid feed oil in a coaxially aligned mixing chamber having catalyst port inlet means adjacent a catalyst riser inlet conduit at the bottom of the riser, the mixing chamber being operatively mounted in the riser and inwardly spaced from the riser wall to form a second upper annular catalyst inlet means for combining a second catalyst increment with substantially vaporized feed in admixture with the first catalyst increment, the first increment being sufficient to effect feed vaporization without substantial cracking thereof, and the second increment being sufficient to provide heat energy for cracking vaporized feed.

These and other features and advantages of the invention will be seen in the following description and in the drawing.

THE DRAWING

DESCRIPTION OF PREFERRED EMBODIMENTS

In general, this invention can be utilized with conventional FCC reactor, such as those disclosed in the references set forth above. Similarly, the process of this invention can also be utilized with various cracking feeds, such as naphthas, gas oils, vacuum gas oils, residual oils, light and heavy distillates and synthetic fuels.

Figure 1:
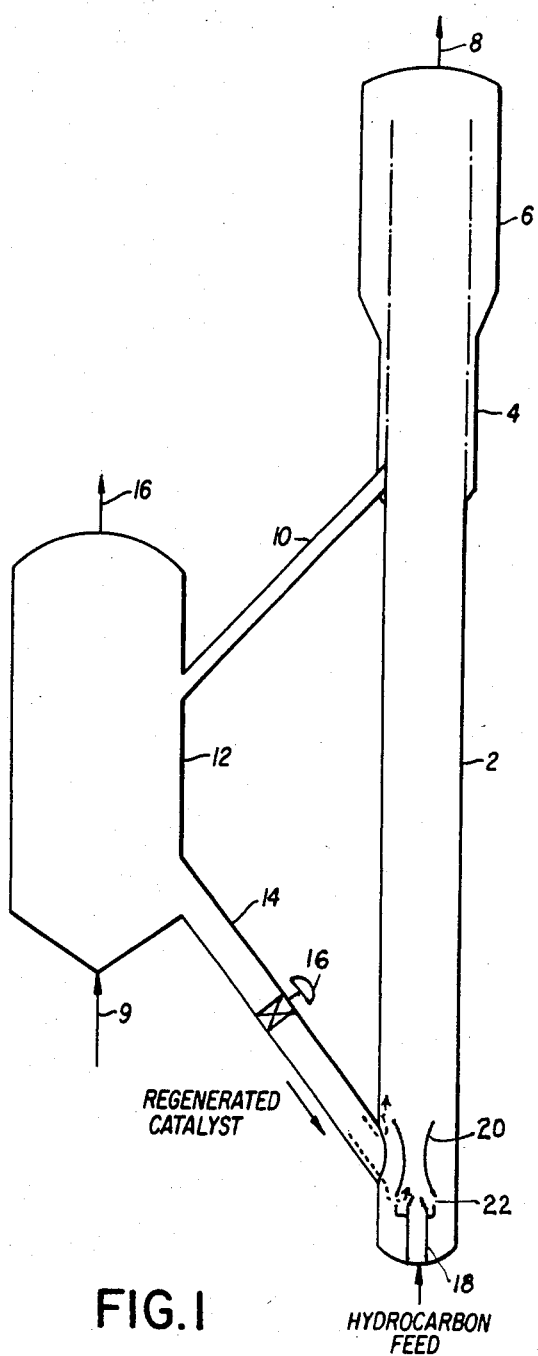
FIG. 1 is a schematic diagram of a vertical FCC reactor and regenerator system, including an improved mixing device.

In reference to FIG. 1, representing a schematic flow diagram of an exemplary FCC unit, a hydrocarbon feed is introduced at the bottom of the riser reactor 2. Hot regenerated catalyst is also introduced to the bottom of the riser by a standpipe supply conduit 14, usually equipped with a flow control valve 16. The feed volatilizes and it forms a suspension with the catalyst which proceeds upwardly in the reactor. The suspension formed in the bottom section of the riser is passed upwardly through the riser under selected temperature and residence time conditions. The suspension passes into a generally wider section of the reactor 6 which contains solid-vapor separation means, such as a conventional cyclone, and means for stripping entrained hydrocarbons from the catalyst. Neither the stripping section, nor the solid-gas separation equipment is shown in the drawing for clarity. Such equipment as that conventionally used in catalytic cracking operations of this kind and its construction and operation, it is believed, will be apparent to those skilled in the art. The vapor separated in the cyclone and in the stripping means, including the diluent vapor, is withdrawn from the reactor by a conduit 8.

Stripped catalyst containing carbonaceous deposits or coke is withdrawn from the bottom of the stripping section through a conduit 10 and conducted to a regeneration zone in vessel 12. In the regeneration zone the catalyst is regenerated by passing an oxygen-containing gas, such as air, through a conduit 9, buring the coke off the catalyst in a regenerator 12 and withdrawing the flue gasses from the regenerator by a conduit 16.

The reactor riser usually comprises an elongated cylindrical smooth-walled tube. The mixing device 20 comprises an axially aligned venturi tube having a plurality of lower catalyst premix ports 22. A coaxially mounted feed inlet motive nozzle 18 terminates within the venturi tube adjacent the catalyst premix ports for ejecting liquid feed into a constricted throat zone of the venturi tube. The venturi tube has an upper outwardly flared discharge end defining an upper annular catalyst inlet means. Although a single tube is depicted, one skilled in the art may modify the reactor design to accomodate multiple venturi-type mixing devices.

The oil feed stock (preheated or not) is used as the propulsion medium in an ejector type device 20, which achieves mixing of the oil feed with a controlled quantity of hot catalyst. Premix ports adjacent the outlet of motive nozzle 18 are sized to admit enough hot catalyst to vaporize the oil and preheat the resultant vapors to a temperature somewhat below normal cracking temperature, say 425° C. to 475° C. The mixing and vaporization occurs substantially within the mixing venturi 20 into which the motive nozzle discharges.

As the preheated mixture rises beyond the top discharge end of the mixing venturi it is mixed with additional hot catalyst which flows through the annulus between the mixing venturi and the cracking riser. In a typical FCC installation where an overall catalyst to oil ratio of 5:1 exists, advantageously, the incremental streams can be proportioned so that about two to three parts of catalyst could pass through the premix ports and three to two parts through the annulus. In large scale units multiple mixing devices may be used rather than the single one shown in the drawing.

The fluidic action of the ejector tends to keep a uniform flow of catalyst through the premix ports and minimizes pressure surges associated with sudden mixing of slugs of liquid with hot catalyst. The parts of the ejector and venturi exposed to rapid catalyst movement should be hard surfaced to minimize wear. Suitable grades of steel may be employed as the main materials of construction. In the operation of FCC units according to this catalyst-feedstock mixing technique, the first catalyst increment flows in a continuous stream under steady state conditions from the catalyst supply conduit through the fluidized induction path created by the venturi flow characteristics. The relative ratio of catalyst flowing through the interior of the venturi mixer to catalyst flowing in the annular space outside the venturi can vary depending upon catalyst temperature, feedstock volatility, etc. A typical FCC zeolite catalyst and heavy oil feedstock may operate with a relative weight ratio of about 2:1 to 1:2.

Mixer configuration and relative reactor riser dimensions may be determined from these material properties as well. Venturi design can be optimized by providing the outlet area as a fraction of total reactor riser cross sectional area. Advantageously, the ratio of total venturi outlet area to total riser area $(A/A_t)$ is about 1:1 to 1:3. Adequate venturi induction is achieved with a throat constriction area about 25 to 75% of the outlet area.

Other factors to be considered are the travel path of the first increment from the catalyst supply conduit outlet into the reactor riser and into the venturi tube flow path. In order to avoid undesirable pressure drop, a long tortuous path for the first increment should be avoided or minimized. Typically, the venturi length is chosen to approximate the catalyst supply conduit vertical dimension and is positioned coaxially in the riser within direct flow path or projection aspect of the supply conduit. In a typical installation the venturi longitudinal dimension will be about up to 5 D (riser diameter), preferably 0.5 to 0.8 D.

Figure 2:
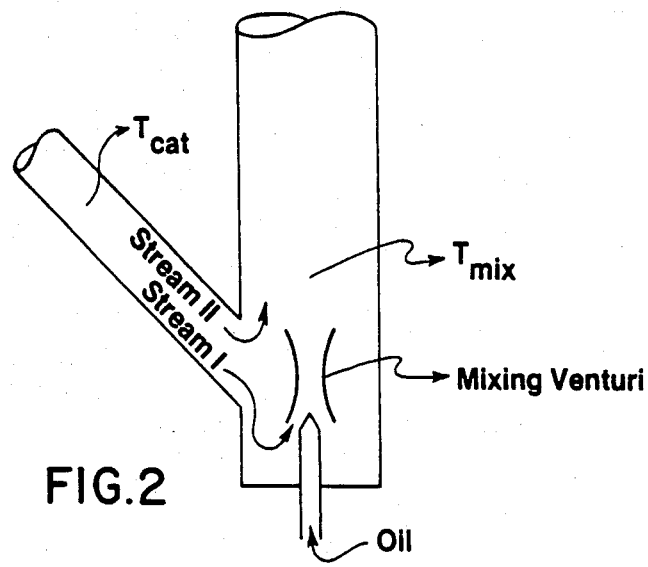
FIG. 2 depicts an alternative venturi-type mixing device.

The venturi structure may be supported in the riser by mounting on the motive nozzle conduit 18, as depicted in FIG. 1 or it may be attached to the riser side walls by radial struts or the like. In FIG. 2 a venturi mixing device is depicted having a substantially open bottom inlet. This modification is designed for a large FCC riser to accomodate 4780 M³/D gas oil feed, having a total area $(A_t)$ of 0.5 m², a venturi outlet area of 0.3 m² and a motive nozzle outlet of 60 cm². The oil velocity leaving the motive nozzle is about 60 m/sec, which induces a flow rate into the venturi inlet of about 1.5 m/sec. The venturi outlet velocity for this design is about 12 m/sec, well above the transport velocity of FCC catalyst-oil mixtures.

Figure 3:
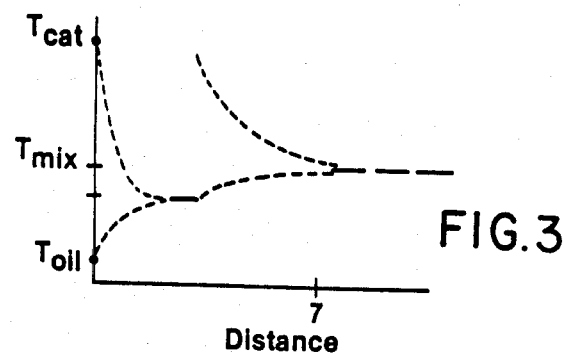
FIG. 3 is a graphic plot mixing temperature vs. riser vertical distance adjacent the venturi mixer.

A typical temperature profile produced by a venturi mixer is depicted in FIG. 3, where average temperature of the catalyst-oil mixture ($T_{mix}$) is plotted against downstream distance across the venturi and downstream. The first catalyst increment (Stream I) flows through the venturi ejector device to partially vaporize incoming oil and the second catalyst increment (Stream II) subsequently brings the mixture to the desired temperature.

Advantageously, the feedstock comprises a petroleum oil fraction at a feed temperature of about 150° C. to 375° C., the hot regenerated catalyst is from the regenerator vessel at about 650° C. to 725° C., the mixture of vaporized feed and the first catalyst portion leaves the venturi tube at a temperature below cracking temperature and is further heated by the second catalyst portion to an average process cracking temperature of about 480° C. to 535° C. The weight ratio of total catalyst to feed is usually about 4:1 to 8:1.

What is claimed is:

1. In a fluid catalytic cracking process comprising admixing a hydrocarbon oil feed with hot regenerated catalyst in the bottom section of a reactor riser, passing the mixture of the hydrocarbon oil feed and the catalyst through the riser, thereby at least partially volatilizing the oil feed and effecting cracking thereof at the process temperature under endothermic process conditions and deactivating the catalyst by deposition of carbonaceous deposits thereon, separating the deactivated catalyst from the cracked hydrocarbonaceous feed, passing the deactivated catalyst to a regenerator vessel wherein the carbonaceous deposits are removed from the deactivated catalyst under exothermic process conditions by means of a regenerating medium introduced into the regenerator vessel, and passing the regenerated hot catalyst substantially above process cracking temperature to the bottom section of the reactor riser; the improvement comprising continuously injecting liquid oil feed into a primary mixing zone in a venturi tube mixer spaced inwardly from the reactor riser wall at the bottom portion therein adjacent a regenerated catalyst return conduit;

continuously passing a first portion of the hot regenerated catalyst into the venturi tube mixer sufficient to vaporize a major amount of oil feed without substantial cracking thereof; and passing a remaining second hot regenerated catalyst portion into the reactor riser through a passage between the venturi tube mixer and reactor riser wall, thereby mixing additional hot catalyst with vaporized oil feed to crack the oil feed in the reactor riser above the venturi tube mixer.

2. The process of claim 1 wherein the feed comprises a petroleum oil fraction at a feed temperature of about 150° C. to 375° C., the hot regenerated catalyst is passed from the regenerator vessel at about 650° C. to 725° C., the mixture of vaporized feed and the first catalyst portion leaves the venturi tube at a temperature below about 425° C. and is further heated by the second catalyst portion to an average process cracking temperature of about 480° C. to 535° C.

3. The process of claim 1 wherein the weight ratio of total catalyst to feed is about 4:1 to 8:1, and wherein a major amount of total catalyst comprises the first portion.

4. The process of claim 1 wherein the venturi tube mixer is coaxially mounted in a vertical tube reactor riser, and wherein the first catalyst portion is admixed with liquid feed oil at a weight ratio of about 3:1 to 4:1 and wherein the second portion is admixed at a feed weight ratio of about 2:1 to 3:1.

* * * * *